United States Patent [19]

Cohen et al.

[11] Patent Number: 5,784,492
[45] Date of Patent: Jul. 21, 1998

[54] APPARATUS AND METHOD FOR DATA COMPRESSION WITH THE CLEAN TECHNIQUE

[75] Inventors: Nathan Cohen, Belmont; Guido Sandri, Boston, both of Mass.

[73] Assignee: Trustees of Boston University, Boston, Mass.

[21] Appl. No.: 404,884

[22] Filed: Mar. 16, 1995

[51] Int. Cl.$^6$ .............................. G06K 9/36; G01S 13/00
[52] U.S. Cl. .......................... 382/232; 382/243; 342/25
[58] Field of Search .................................. 382/279, 273, 382/232, 233, 237, 238, 239, 243, 248, 255, 260, 261, 265, 270, 275, 276, 277, 280, 282, 299, 300, 307, 308; 358/426, 432; 367/42; 128/660.07; 73/602; 395/128; 342/25

[56] References Cited

U.S. PATENT DOCUMENTS 5,262,878  11/1993  Esserman .............................. 358/426
5,394,151   2/1995  Knaell et al. ........................... 342/25

OTHER PUBLICATIONS

"Inverse Problems and Antidiffusion," *Boston University Graduate School*, Ph.D. Dissertation, Constantin S. Konstantopoulos, 1992.

"Data Compression Using the Deconvolution Algorithm CLEAN," Cohen, et al., *International Journal of Imaging Systems and Technology*, vol. 5, pp. 28–32, 1994.

"Digital Image Processing" R. C. Gonzalez and R. E. Woods, pp. 8–10, 320–321, Addison–Wesley (1992).

"Digital ans Analog CommunicationSystems" L. W. Couch II 3rd ed. p. 9, MacMillan Publishing Company (1990).

*Primary Examiner*—Edward L. Coles, Sr.
*Assistant Examiner*—Wenpeng Chen
*Attorney, Agent, or Firm*—Samuels, Gauthier, Stevens & Reppert

[57] ABSTRACT

A method and system for deconvolution derived from the CLEAN technique. The nonlinear CLEAN method, combined with a priori knowledge of the point spread function allows for extraction and subsequent transmission of the non-redundant information. The point spread function is then treated as the redundancy function. Thus, the data set may be regarded as a convolution of the non-redundant information with the redundancy function. Since the non-redundant data is a small subset of the overall data set, images and/or other data may be transmitted over narrow-band channels using the system of this invention. Effective data compression may be further enhanced by using the system of this invention prior to additional compression or encoding techniques based upon the digital data and digital compression techniques.

10 Claims, 7 Drawing Sheets

APPARATUS AND METHOD FOR DATA COMPRESSION WITH THE CLEAN TECHNIQUE

FIELD OF THE INVENTION

This invention relates generally to a device and technique for data compression and more specifically to compression wherein non-redundant information is extracted through deconvolution techniques.

BACKGROUND OF THE INVENTION

Many scientific and engineering applications presently involve some sort of digital image processing. The digital images which are studied cover an incredibly broad range of applications including, by way of example, early fetus development using sonograms, astronomical images created through a myriad of light detecting instruments and medical applications such as MRI, PET and NMR devices. In addition, devices as simplistic and pervasive as facsimile machines involve digital images to which the teachings of this invention apply. The processing of these images requires the conversion of a continuous set of analog data into a corresponding digital form. Two-dimensional images are commonly rasterized by scanning images spots contained in the analog data set. Each pixel resulting from the scan is sampled so as to quantize the particular intensity associated with the pixel. These intensity values are combined with the physical coordinates of the pixels to create a representation of the overall image.

In many cases, the resulting digital data must be transmitted to a remote location and processed and/or stored there. Unfortunately, these transmission and storage requirements can often be the limiting factor in a system operating on the digital information. In other words, the cost of implementing a transmission channel capable of passing data at the required rate may make the overall system unjustifiable. Moreover, in some cases, the required rate of transmission may be unachievable at any cost. Similarly, memory requirements for storing the transmitted data may be too costly or impossible given other system constraints.

One solution to this problem is digital data compression. There exist numerous techniques for processing the digital data after it has been converted from analog form such that the amount of data actually transmitted is decreased from that of the original data set while maintaining the integrity of the original data set. In all cases, the original data set is recovered at the receiver through a complementary decompression scheme.

As mentioned, since a substantial amount of digital data must be stored and/or transmitted in a typical application, it is advantageous to eliminate redundant data contained within a data set so that the data set can be stored in the available storage space or so that the data set can be transmitted in the available radio frequency (RF) spectrum in a timely manner. Video compression techniques are often employed so that digital video television signals may be efficiently transmitted over common communication channels such as satellite or cable. Many of these techniques operate by taking advantage of the correlation among adjacent pixels resulting in a redundancy that can be removed from the data stream without effecting the intended representation of the video signal.

Many of the available digital decompression techniques involve substantial overhead. That is, often the processing required to implement the decompression can, itself, be an impediment to the efficient transmission of data. Additional problems with conventional digital decompression techniques arise when the data set does not avail itself to the particular technique being used for decompression. For example, the above discussed method of removing redundancy by looking at the correlation among adjacent pixels may not be as effective for certain types of images. Further, digital compression techniques based upon an expectation that successive video frames will contain similar data may not be effective with, for example, a succession of still images.

There thus exists a need for a suitable method and apparatus capable of compressing a large variety of data efficiently, consistently, and with a high compression ratio.

SUMMARY OF THE INVENTION

It is therefore an object of the current invention to overcome the above described and other drawbacks of the prior art.

It is an additional object of this invention to provide a method and apparatus for performing data compression across a broad variety of applications.

It is a further object of this invention to provide such a method and apparatus which performs analog signal compression prior to data transmission.

It is a still further object of this invention to provide such compression in an efficient and expedient manner either with or without accompanying digital compression techniques.

These and other objects of this invention are accomplished through the use of a method for deconvolution derived from the CLEAN technique. The nonlinear CLEAN method, combined with a priori knowledge of the point spread function allows for extraction and subsequent transmission of the non-redundant information. The point spread function is then treated as the redundancy function. Thus, the data set may be regarded as a convolution of the non-redundant information with the redundancy function. Since the non-redundant data is a small subset of the overall data set, images and/or data may be transmitted over narrowband channels using the system of this invention. Effective data compression may be further enhanced by using the system of this invention prior to additional compression or encoding techniques based upon the digital data and digital compression techniques.

The foregoing and other objects, features, and advantages of the invention will be apparent from the following more particular description of the preferred embodiments of the invention, as illustrated in the accompanying drawings.

DESCRIPTION OF THE INVENTION

A general class of problems arising with respect to the processing of images that are obtained from analog sources is that of convolution. A variety of effects inherent to the measuring instrument and the propagation medium combine to degrade the image accuracy. These effects include sidelobes, clutter, blurring and phase aberration. In response to these problems, techniques generally referred to as deconvolution methods have been developed for image enhancement. One such technique is known as CLEAN.

CLEAN was first described by Hogbom in "Aperture Synthesis with a Non-regular Distribution of Interferometer Baselines", Astronomy and Astrophysics Supplement Series, Vol 15, pp. 417–426 (1974). It remains among the most utilized of deconvolution methods in the field of astronomy. The utility of this method has been proven as a result of its ease of programming, accuracy and general applicability to a variety of applications. CLEAN is a nonlinear, arithmetic, sequentially iterative process for achieving deconvolution.

The CLEAN method is further beneficial because it is robust, affords superresolution and does not require precise knowledge of the point spread function (PSF) to achieve acceptable deconvolution. Furthermore, its simple arithmetic approach in the data domain obviates the need for processing involving the inverse domain. As a result, CLEAN is used for a great many standard deconvolution applications.

One compelling impediment against the use of CLEAN for deconvolution is its computational speed. Like all non-linear deconvolution schemes, CLEAN is slower (often by an order of magnitude or more) than linear deconvolution. CLEAN has been reported, however, to be faster than many other nonlinear deconvolution methods. See "Comparative Study of Real-Time Deconvolution Methods in Medical Imaging", by N. Cohen and G. Sandri, Biomedical Image Processing and 3-D Microscopy: Proc. SPIE 1660. R. Achyra, C. Cogswell, and D. Goldgof, eds., SPIE, Bellingham, Wash., 1992, pp. 88–94.

CLEAN is an arithmetic, sequentially iterative process in which each iteration involves the fractional subtraction of the PSF (via loop gain $\gamma$) from the data domain at the position of the peak feature within the PSF. Each iteration provides a component representing the delta function between the PSF and the data domain resulting in an array of CLEAN components. The residual data domain then comprises the data set for the next iteration. When the intensity of the residual data domain falls below a threshold level (T), the subtractive phase terminates.

At this point, the above-described array of CLEAN components is available for the next phase of the CLEAN method, the reconstructive phase. In a typical deconvolution application the reconstructive phase would be performed next. In the reconstructive phase, the array of CLEAN components is multiplied by a second PSF (the "CLEAN beam") to recover the deblurred image. As will be described in detail below, the CLEAN beam is typically constructed based upon the particular characteristics of the imaging apparatus or data set. Threshold residuals may further be added to the reconstructed image or data set if desired.

The important aspects of this invention employ the CLEAN technique in a novel manner. According to the present invention, once subtractive phase processing is complete, the reconstructive phase is delayed. While the data exists in its non-redundant state as evidenced by the CLEAN components, the data may be converted to digital form for transmission and/or storage. In addition, the digitized CLEAN components may be further compressed according to known digital compression techniques prior to transmission. The general CLEAN process is next described followed by a specific discussion of analog compression using CLEAN.

CLEAN is one of dozens of methods developed to solve the inverse problem (i.e. deconvolving images which have been degraded due to properties of the transmission medium and or the measuring instrumentation). One of the primary advantages of the CLEAN technique is its relative insensitivity to imprecision in the known point spread function. Thus, fairly accurate results can be achieved without specific and precise knowledge of the point spread function for a particular data set.

In particular, the CLEAN methodology typically calls for a two-stage process requiring both deconvolution and convolution. In the first stage, the PSF (dirty beam) is fractionally subtracted (via a loop gain), in an iterative fashion, from the data set at the position of feature peaks until the residual data set is featureless (to below a preset threshold) or dominated by thermal noise. The output of this first stage is a data set consisting of delta functions (CLEAN components). These CLEAN components are then convolved in the second stage with another point spread function which lacks sidelobes (CLEAN beam) to form a reconstruction of the original data set having no artifacts (sidelobes) originally present in the dirty beam.

Reference is made to J. Hogbom, "Aperture Synthesis with a Non-Regular Distribution of Interferometer Baselines", Astronomy and Astrophysics Supplement Series, 15, pp. 417–426, for a general description of the CLEAN technique. Reference is also made to copending application Ser. No. 08/346,253 filed on Nov. 23, 1994, which describes a novel modification to the general CLEAN technique and which is hereby incorporated by reference. The techniques disclosed in this copending application have applicability to the compression methodologies of this invention as discussed below.

The novel techniques for decompression disclosed herein are predicated on a novel interpretation of the point spread function. The PSF is usually regarded as a functional indication of the degradation of the information which can be extracted from a given image or data set. It quantifies how the information at a specific function value is blurred into other function values, usually at values adjacent to a given value. An identical interpretation has a different significance: this "degradation" may be viewed as a re-distribution of information associated with a specific function value across the data set. In effect, the re-distribution amounts to a redundancy of information. The PSF may be equally and aptly described as a "redundancy function" which relates to how much of the information at a given function value is redundant to that specified by another function value.

Clearly, a broad PSF distributes the information widely, maximizing redundancy. Too much redundancy leads to an inability to extract information in a unique and meaningful way. Redundancy is an inherent part of a meaningful data set of representing an image and is normally desirable even when a subset of non-redundant data is available. This can be physically interpreted as indicating that no imaging system has a PSF which is a point, so that every feature in an image field shares some correlation with some other portions of the image field. The redundancy is a physically determined attribute.

Deconvolution algorithms seek to remove the fraction of the redundancy in the image associated with the sidelobe response. The redundancy which comprises the diffraction limit of the main lobe is maintained. In fact, minimum fractional redundancy might well be expressed as a form of "maximum entropy". Even though a specific technique may be termed a "maximum entropy method", all known deconvolution methods accomplish a redundancy reduction and thus increase "image entropy".

Although CLEAN is a deblurring or deconvolution method, there is nothing intrinsic to its algorithm which makes it so. Rather, it is a process whereby the redundancy function is removed and then replaced by another. For example, CLEAN could be used to blur an image by choosing a CLEAN beam which is broader than the dirty beam, increasing image redundancy. CLEAN allows control of the redundancy in the processed image or data set, which allows applications more general than just a deconvolution.

In fact, the CLEAN methodology allows for the maximum removal of image redundancy, if so desired. This function is achieved upon generation of the CLEAN components. Each CLEAN component specifies the intensity and function value of the PSF or the redundancy function in the reconstructed data set or image. In other words, for a given loop gain, the CLEAN components are uniquely non-redundant. In the CLEAN methodology, the CLEAN components do not provide a complete indication of the information in the data set, but rather a representation of the non-redundant information in the data set. In this way, a sparse image can be transmitted and or stored. The reconstruction of the data set from the non-redundant information corresponds to convolving the CLEAN components with the CLEAN beam, or any other PSF.

To reconstruct the original data set from its non-redundant subset, it is necessary to choose the CLEAN and dirty beams to be exactly the same. In a preferred embodiment of this invention, both beams are selected as the natural PSF for the particular dataset. The "natural PSF" refers to the point spread function occurring naturally through a particular imaging technique. Other PSFs, in which more (or less) emphasis is placed on the high spatial frequencies of the image (i.e. more or less oversampling), may alternatively be used in accordance with the present invention. The redundancy extracted from the original image will be equivalent to the reconstructed redundancy assuming that the PSF selected is the natural one associated with the data set.

As mentioned, CLEAN also functions with the use of other than the natural PSF as the dirty beam. If the spatial frequency spectrum of the dirty beam has less high frequency components than those of the natural PSF, then using CLEAN in this mode will smooth the data; CLEAN acts as a low-pass filter and the reconstructed data will be a smooth version of the original. Conversely, if the transform of the dirty beam contains more higher frequency components than the PSF, the reconstructed data set will replicate the original, but contain more CLEAN components than necessary. CLEAN does not require knowledge of the PSF, but in a preferred embodiment, the PSF is selected such that the best replication is achieved based upon a specific number of CLEAN components.

While an image comprising non-redundant data is of limited physical meaning, there are circumstances under which usage of the non-redundant information is desirable. One instance occurs when bandwidth or storage capacity is limited and when it is necessary to transmit or store data respectively. For example, if the transmission channel is narrow, it may not be possible to transmit the entire data set within an acceptable time frame. However, if the redundancy function is known to the receiver and transmitter, only the non-redundant subset need be conveyed. In such case, transmission time can often be significantly improved over what it would be to transmit the original data set including the redundant information.

The data transmitted according to the method of this invention may be regarded as "compressed", since recovery is possible from the transmission of only a subset of the original data. CLEAN's ability to produce a non-redundant data set makes it an advantageous vehicle for achieving compression, and it is also an efficient mechanism for extracting the resulting non-redundant data.

The methods of this invention may be applied in numerous ways. For example, prior to any encoded digital compression, the analog data may be compressed by reducing it to its non-redundant subset. Conversely, analog compression according to the methods of this invention may be applied without any corresponding digital compression scheme.

Figure 1:
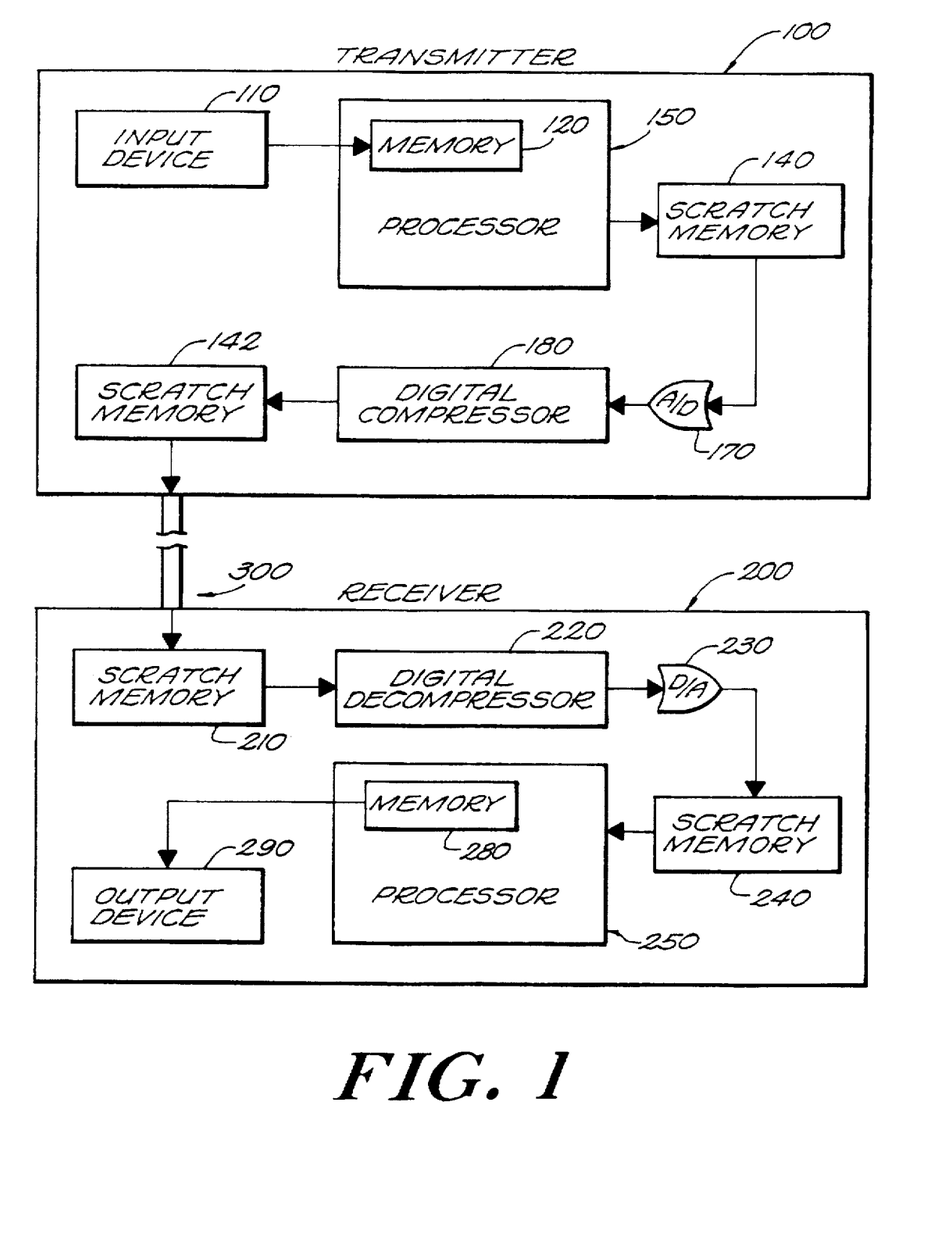
FIG. 1 is a block diagram illustrating the system of the present invention according to a preferred embodiment thereof.

FIG. 1 illustrates one possible embodiment of the system of this invention. Such a system includes generally a transmitter 100 and a receiver 200. The system of the present invention may be employed to rapidly transmit data between transmitter 100 and receiver 200 employing the compression scheme of the present invention. Transmitter 100 includes at least one input device 110 for loading the original data set into memory 120. Alternatively, internal processes within processor 150 or processes interfacing with processor 150 may generate the original data set which is loaded into memory 120 for further processing according to the novel techniques of this invention. The input device 110 may be a personal computer, a fax machine, a scanner or any other input device allowing the input of an analog data set into memory 120. Memory 120 is, in one embodiment, located within processor 150. Alternatively, memory 120 may be contained within input device 110 or as a separate component of transmitter 100.

A clean PSF, which is required to compress the image as discussed below, is generated as is known in the art and may also be stored in memory 120. Alternatively, the clean PSF may be stored in any other suitable memory structure within or interfacing with the system of this invention.

Processor 150 is programmed to perform the initial compression of the dataset according to this invention as will be described below. The programming may be accomplished through the use of software, microcode, hardcoding or any other programming technique known in the art. Once processed according to the techniques of this invention, the compressed analog data is temporarily stored in transmitter scratch memory 140. A/D converter 170 accesses the compressed analog data from transmitter scratch memory 140 converting it to a digital format. A/D converter 170 and its operation are well known in the art. Once converted to digital format, the data may optionally be further compressed according to known digital compression techniques by digital compressor 180. If further compressed, the resulting data may be stored alternatively in additional storage locations within transmitter scratch memory 140 or in a second transmitter scratch memory 142.

In either case, the digital data, whether located in transmitter scratch memory 140 or transmitter scratch memory 142 is transmitted as known in the art through transmission means 300 to receiver scratch memory 210. In accordance with the novel advantages of this invention, the compressed data may be transmitted at a much more rapid pace than would be possible for the data in uncompressed form.

Receiver 200 and transmitter 100 communicate processing information such as the digital compression algorithm, the PSF(s) necessary for analog decompression and the transmission format of the data as well as other parameters necessary for consistent treatment of transmitted data. Alternatively, these parameters may be permanently stored within various storage locations in receiver 200 and transmitter 100.

In the event that the transmitter 100 performed digital compression prior to data transmission, digital decompressor 220 is enabled to decompress the transmitted data according to a decompression algorithm complementary to the compression algorithm employed at the transmitter. In addition, the clean PSF, which was used to compress the image is stored in memory 210. Alternatively, the clean PSF may be stored in any other suitable memory structure within or interfacing with the system of this invention D/A converter 230 next converts the data to analog format and stores the resultant data set in scratch memory 240. Processor 250 operates according to the aspects of this invention, discussed below, to perform analog decompression of the data and stores the resultant data in memory 280. As with the transmitter, memory 280 may be internal to processor 250, internal to output device 290, or a separate component of receiver 200. Output device 290 accesses the decompressed data stored in memory 280 and processes it for output. Output device 290 may be any number of devices capable of indicating the resultant data set to a human operator. Examples include a display monitor, a printer or a graphics tablet although other possibilities certainly exist. Alternatively, the decompressed data set may be stored in memory 280 (or another memory) for later use, display or processing.

Figure 2:
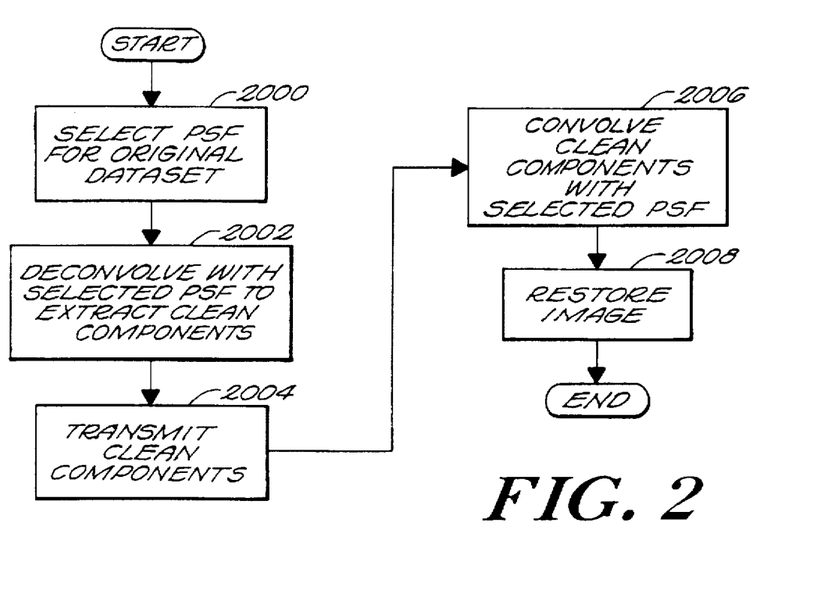
FIG. 2 is a flow chart illustrating the a preferred embodiment of the method of the current invention.

FIG. 2 is a flow chart which is useful in illustrating the overall process of the present invention. The overall process will be described broadly with reference to FIG. 2 after which a more detailed description will follow in connection with the remaining figures. Initially, the data set to be compressed and/or transmitted is input or accessed. Depending upon the particular data set, a point spread function is next selected which operates as the "key" in compressing and decompressing. As discussed below, in a preferred embodiment of the present invention, the PSF selected is the natural PSF for the data set. Once the PSF is selected, the data set is deconvolved (CLEANed) with the selected PSF to generate an array of CLEAN components.

These CLEAN components, which are generally devoid of redundant data, are next transmitted from the transmitting apparatus to the receiving apparatus. Alternatively, the CLEAN components may be stored as compressed data for later use following decompression. As described above, digital compression techniques may also be employed prior to transmission and/or storage.

In order for proper decompression, the receiving apparatus must have access to the selected PSF. In one preferred embodiment of this invention, the receiver maintains a permanent or semi-permanent copy of the selected PSF internally. In a second preferred embodiment, the selected PSF is transmitted along with the CLEAN components.

Once the CLEAN components and/or the PSF arrive at the receiver, the original data set may be restored by convolving the CLEAN components with the selected PSF. In the event digital compression was employed at the transmitter, complementary digital decompression is performed prior to convolution.

Figure 3A:
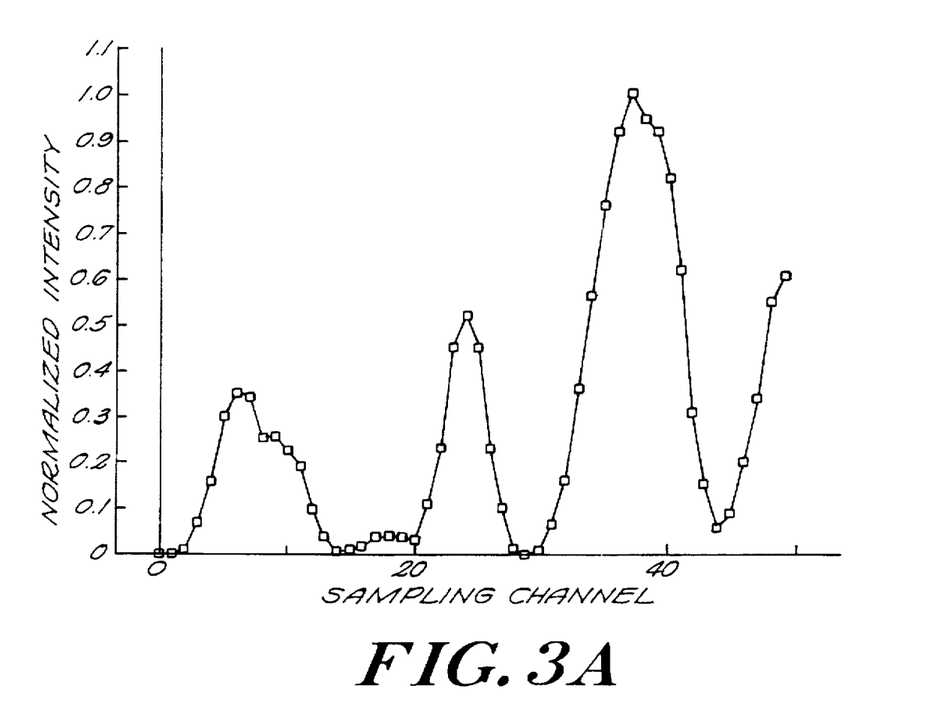
FIG. 3(a) is a graph reflecting a sample of data to be processed by the methods of the current invention.
Figure 3B:
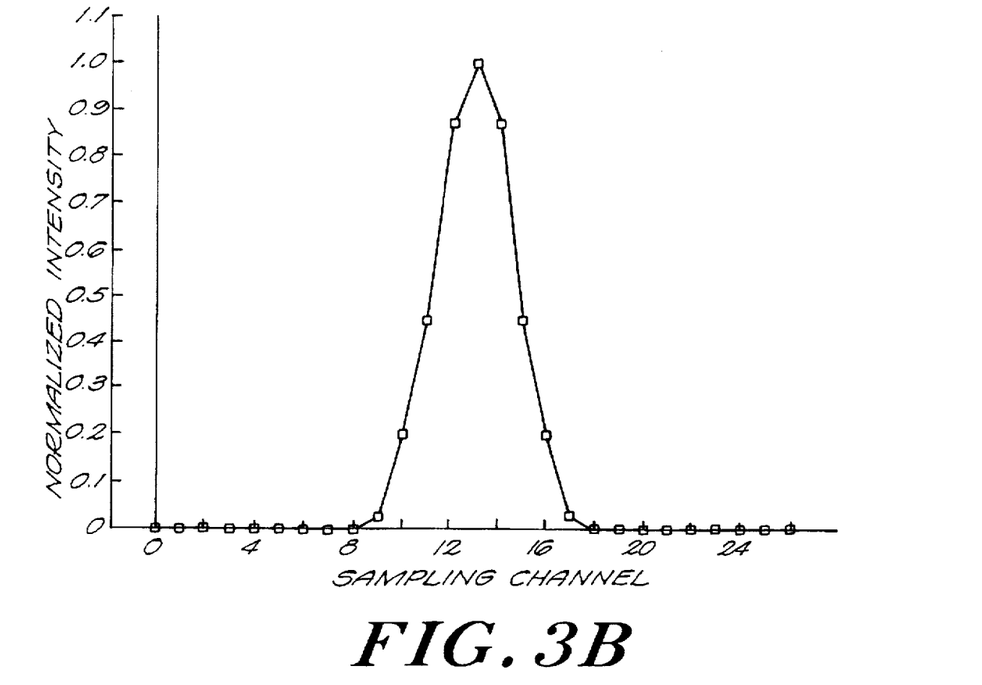
FIG. 3(b) is a graph illustrating a selected point spread function which is used in processing the data sample of FIG. 3(a)

FIG. 3(a) is a graphical representation of a sample data set to be compressed. It will be useful in demonstrating the methods of this invention. FIG. 3(b) is a dirty beam which is selected to match the actual point spread function which produced the sample data set of FIG. 2(a). It is not necessary to use a PSF which is the actual point spread function that produced the data set. As will be illustrated and discussed below, the PSF employed in deconvolution may be selected to be broader or narrower than this "natural" PSF. However, in the example corresponding to FIG. 3, the natural PSF is used.

After the dirty beam PSF has been selected, the sample data set is CLEANed using the selected dirty beam. Representing the data set which is deconvolved as a one variable function, for simplicity, the data from an iteration of CLEAN may be represented as:

$$I(x)_{n+1}=I(x)_n-\gamma P(x)\delta(x-x_p); \quad (1)$$

where n represents the iteration number, x is position, and $x_p$ is the position of the peak feature for iteration n. (See Cohen and Sandri, 1994) In effect, the $\delta$ function positions the center of the PSP (P(x)) for the subtraction. Here, only one feature and the region around it is subtracted. The loop gain is represented by $\gamma$. Typical values for $\gamma$ are 0.1 to 0.5. As is understood by one of ordinary skill in the art, the CLEAN method is not limited to one-variable functions and the description above is merely exemplary.

Figure 3C:
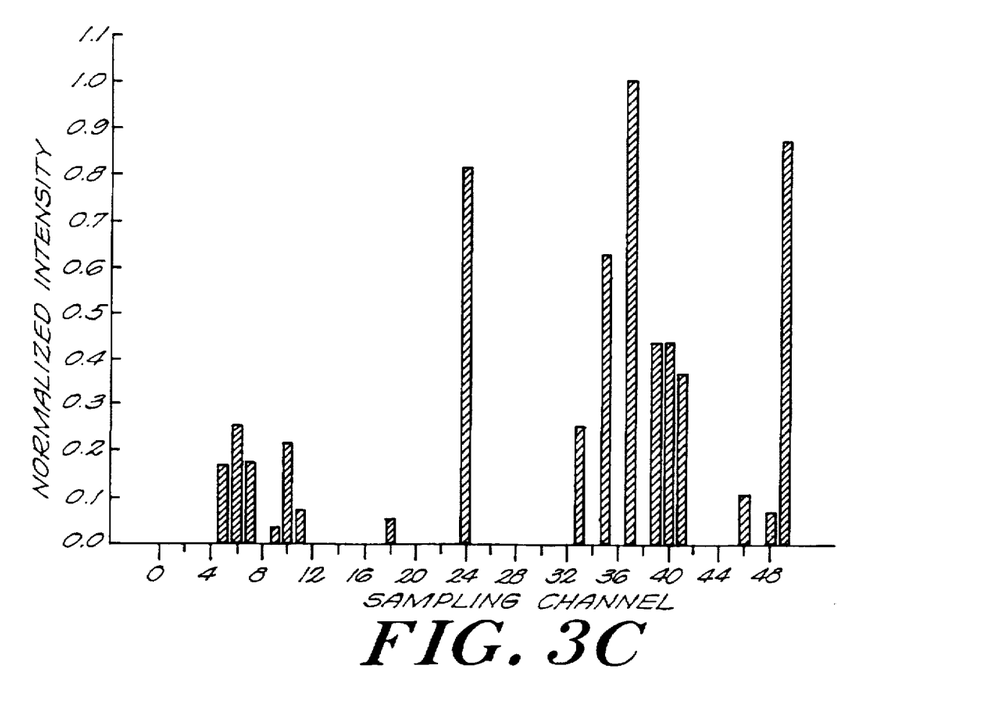
FIG. 3(c) is a graph illustrating the derived CLEAN components after deconvolution during the method of this invention.
Figure 3D:
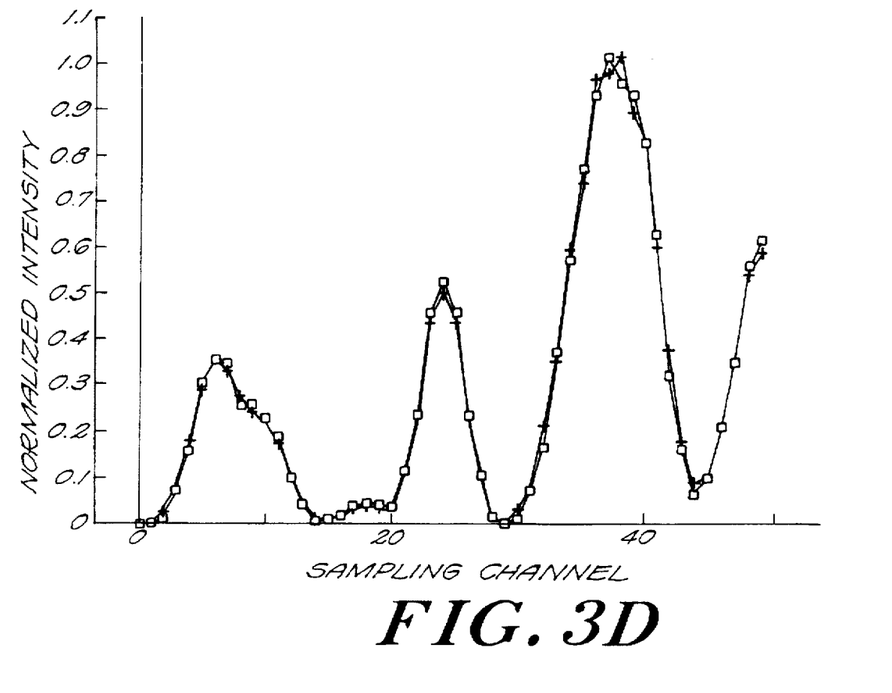
FIG. 3(d) is a graph illustrating the comparison between the sample data and the reconstructed data as a result of the method of this invention.
Figure 3E:
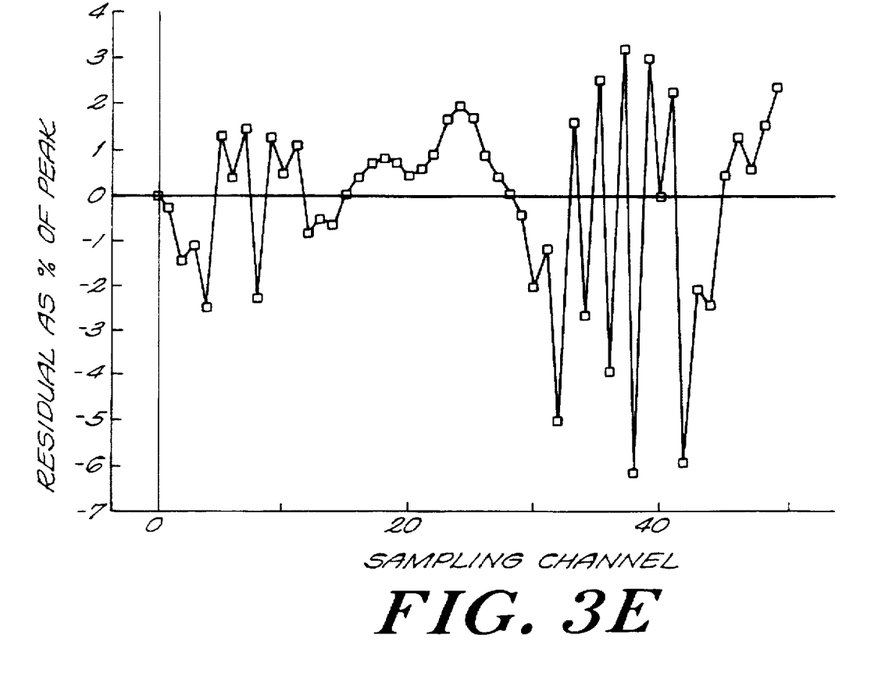
FIG. 3(e) is graph illustrating the difference spectrum resulting from the compression of the data sample of FIG. 3(a)

The result of this operation is a set of CLEAN components which are illustrated in FIG. 3(c). Next, the CLEAN components of FIG. 3(c) are convolved with the PSF of FIG. 3(b) to yield the decompressed original data set. FIG. 3(d) illustrates the reconstructed data set superimposed over the original data set. The original data points are depicted as boxes in the figure and the reconstructed data points are represented by crosses. As is apparent in FIG. 3(d), the reconstructed data set tracks the original data set very closely. FIG. 3(e) is provided for comparison purposes. It illustrates, using various points on the sampling channel as the domain, the variance at each such point between the original data set and the reconstructed data set. Note that the maximum variance for this data set using the natural PSF is approximately 6% occurring at the portion of the sampling channel denominated 38.

It is clear from this example that the reconstructed spectra is virtually the same as the original even though the CLEAN component data is substantially more sparse than the original graph. One measure of the extent to which a data set is compressed is a ratio of information content between the original and compressed forms:

$$R = \frac{\left(\sum_{0}^{N} I_i \log I_i\right)_{CLEAN}}{\left(\sum_{0}^{N} I_i \log I_i\right)_{orig}} \quad (1)$$

where $I_i$ is the normalized intensity of pixel I, and the summation occurs for N pixels for both the original and CLEAN component data sets. In the example corresponding to FIG. 3, the PSF was chosen to be the "natural" one for the spectra. However, other PSF's may be used as discussed, at the expense of overconstraining or spectral smoothing. In FIGS. 4 and 5, the same process is discussed but with PSF's which are broader than and narrower than, respectively, the natural PSF for the original data set.

Figure 4A:
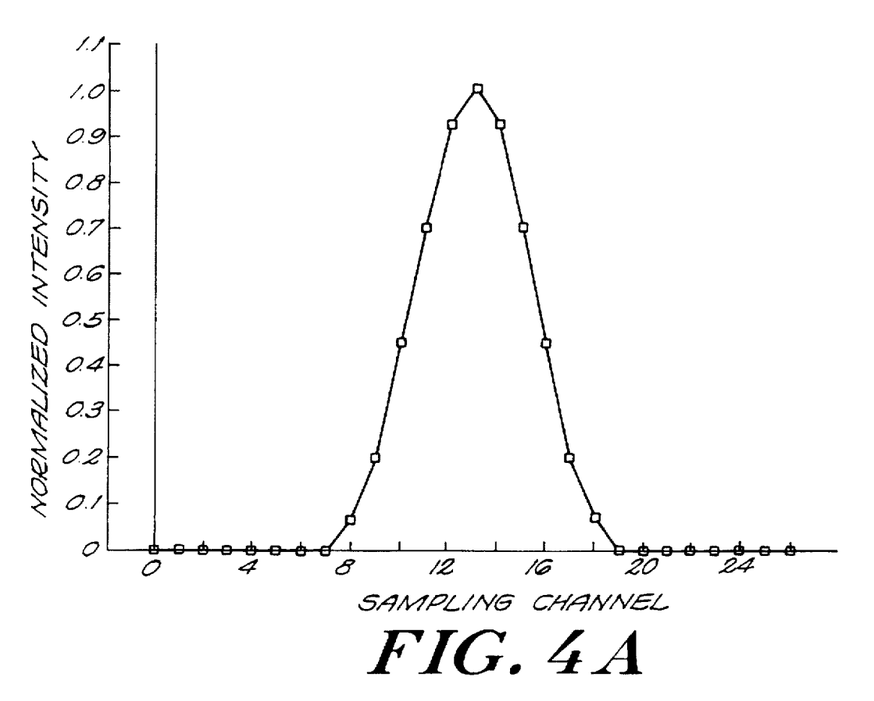
FIG. 4(a) is a graph illustrating an second selected point spread function which is used in processing the data sample of FIG. 3(a)
Figure 4B:
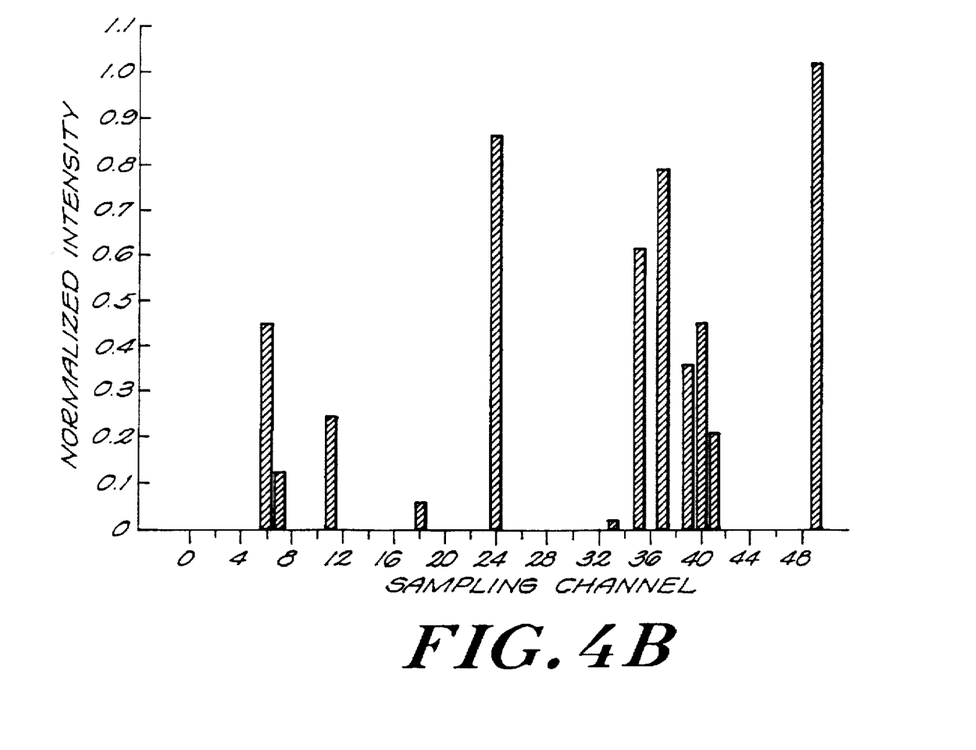
FIG. 4(b) is a graph illustrating the derived CLEAN components after deconvolution during the method of this invention and using the point spread function of FIG. 4(a)
Figure 4C:
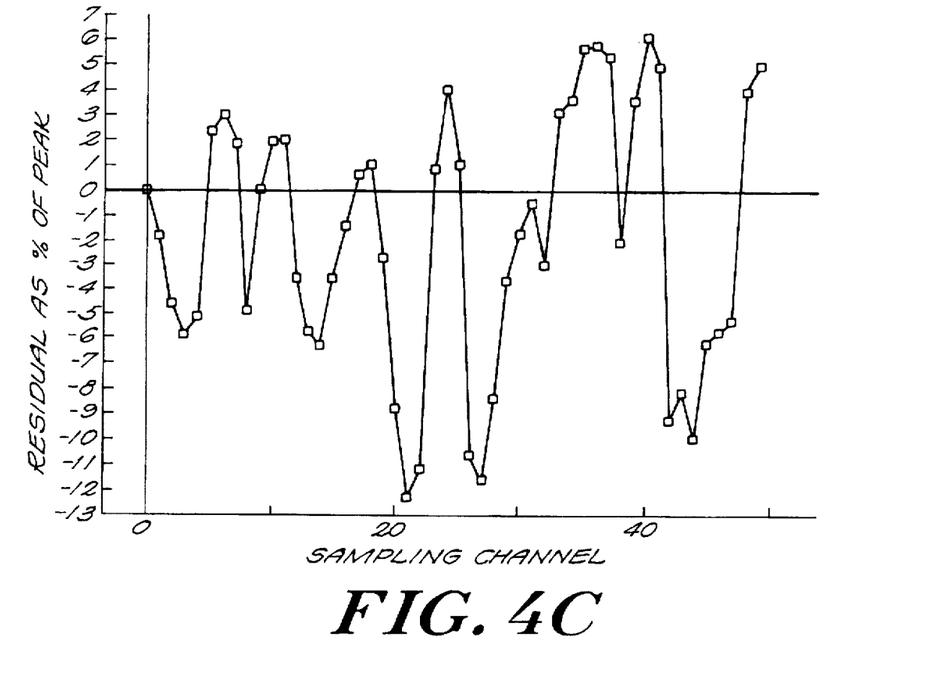
FIG. 4(c) is graph illustrating the difference spectrum resulting from the compression of the data sample of FIG. 3(a) using the point spread function of FIG. 4(a)
Figure 5A:
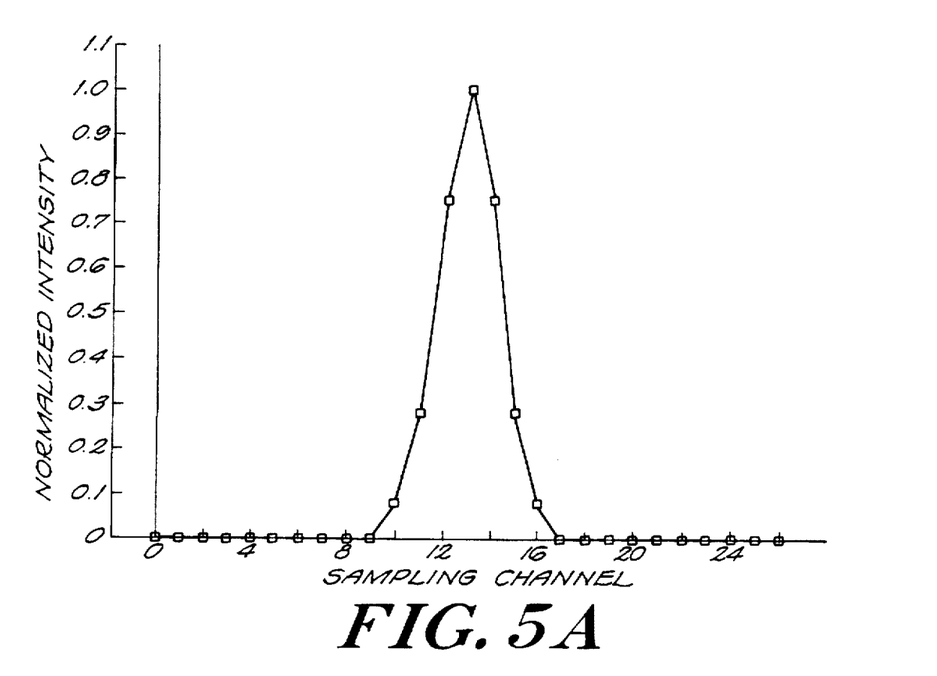
FIG. 5(a) is a graph illustrating a third selected point spread function which is used in processing the data sample of FIG. 3(a)
Figure 5B:
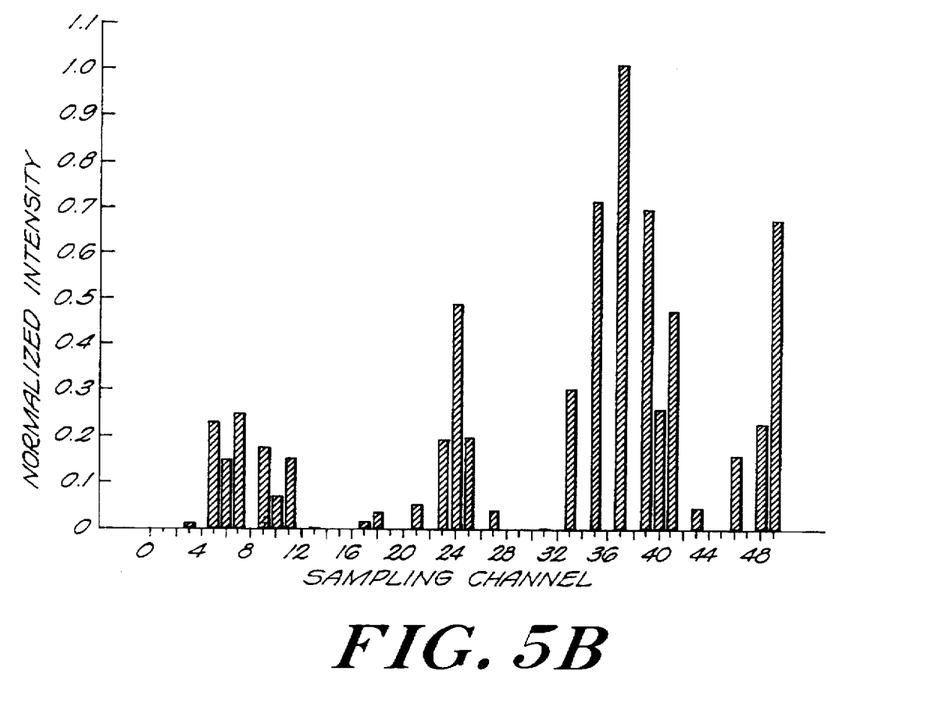
FIG. 5(b) is a graph illustrating the derived CLEAN components after deconvolution during the method of this invention and using the point spread function of FIG. 5(a)
Figure 5C:
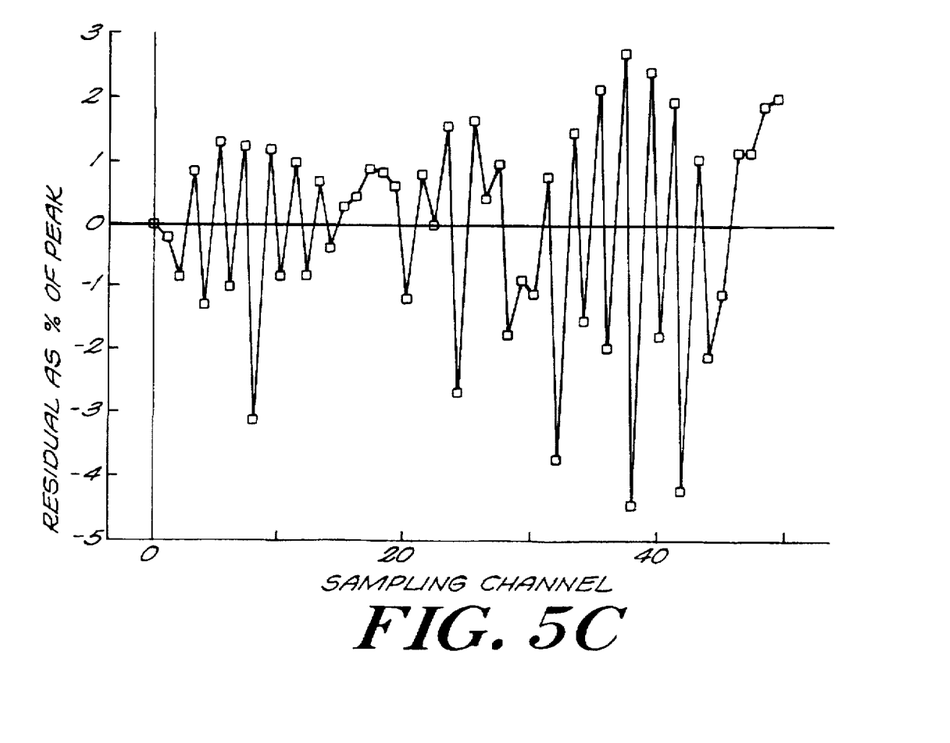
FIG. 5(c) is graph illustrating the difference spectrum resulting from the compression of the data sample of FIG. 3(a) using the point spread function of FIG. 5(a).

In FIG. 4, a PSF broader than the natural PSF for the dataset is used in the compression process. FIG. 4(a) shows the PSF used as both the dirty and the CLEAN beam. FIG. 4(b) shows the resulting CLEAN components generated as a result of the subtractive phase. Finally, the difference spectrum, indicating the deviation between the original and the reconstructed data throughout the sampling channel, is provided in FIG. 4(c). It can be seen in FIG. 4(c) that deviations as high as almost 13% occur when a broad PSF is used. Although a broad PSF results in a relatively similar compression effectiveness as that of the natural PSF, the reconstruction is significantly In FIG. 5, a PSF which is narrower than the natural PSF for the dataset is used in the compression process. FIG. 5(a) shows the PSF used as both the dirty and the CLEAN beam. FIG. 5(b) shows the resulting CLEAN components generated as a result of the subtractive phase. Finally, the difference spectrum, indicating the deviation between the original and the reconstructed data throughout the sampling channel, is provided in FIG. 5(c). As described above, with a narrower (less high frequency components) PSF, the use of CLEAN acts to smooth the data. It can be seen by comparing FIG. 3(e) with FIG. 5(c) that the reconstruction with a narrower PSF is more accurate. Unfortunately, however, as illustrated in Table I, the data is not compressed as effectively in the case when a narrower PSF is used. This is the case because more than the necessary number of CLEAN components are generated as a result of the subtractive phase when a narrow PSF is employed. As is readily apparent, a less effective compression is undesirable since data transmission will require more time and data storage will require more memory.

The following table presents the "entropy ratios" for the three reconstructions.

TABLE I

| INFORMATION RATIOS FOR CLEAN COMPRESSION | | |
|---|---|---|
| PSF | R (Excludes PSF) | R (Includes PSF) |
| Natural | 0.14 | 0.23 |
| Broad | 0.31 | 0.41 |
| Narrow | 0.87 | 0.94 |

With a factor of an order of magnitude, the data reduction advantage is evident. It is fair to assume that an order of magnitude compression is common with CLEAN, although the compression effectiveness will be generally sensitive to the form of the PSF and its sampling in the spatial domain. Comparison of the three reconstructions reveal that, as described, the compression ratio as well as reconstruction accuracy will depend on how closely the dirty/CLEAN beams replicate the PSF of the data.

The techniques of this invention may be applied to datasets structured in more than one dimension. For example, in video applications (digital or analog), grey scale information may be associated with each pixel element. In this case, the representation of the image occurs in three dimensions (horizontal and vertical location and brightness). Additional applications of this invention may include compression of four (or more) dimensional data. In such applications, processing and transmission speed increases with approximately the square of the dimensionality.

An additional issue of concern involves the transmission and information content of the PSF itself. The PSF and CLEAN components together form the information base for reconstructing the original data set. However, if the information content of the PSF is small in comparison to that of the original data set, the contribution offered by the PSF may be discounted. In this case it may be beneficial to transmit the PSF along with the CLEAN components. Otherwise, in cases where the transmission of the PSF itself is a constraining factor, it is advantageous to store the PSF at both the transmitting and receiving stations. Table I, above, indicates compression ratios for cases where the PSF is included with the compressed data as well as cases where it is not.

While the invention has been particularly described with reference to particular embodiments thereof, it will be understood by those skilled in the art that various other changes in detail may be made therein without departing from the spirit, scope or teachings of this invention.

What is claimed is:

1. A method for compressing an analog data set comprising the steps of:

selecting a point spread function; and generating a compressed data set containing non-redundant components by deconvolving said analog data set with the selected point spread function.

2. The method of claim 1 wherein said step of generating a compressed data set containing non-redundant components comprises generating an array of CLEAN components.

3. The method of claim 1 where said point spread function is the natural point spread function for the analog data set.

4. The method of claim 2 further comprising the step of storing said array of CLEAN components as a compressed data set.

5. The method of claim 2 further comprising the step of transmitting said array of CLEAN components as a compressed data set.

6. The method of claim 1 further comprising the steps of converting said compressed data set to digital data; and compressing said digital data.

7. The method of claim 1 wherein said analog data set is represented in multiple dimensions.

8. A system for the compression of data comprising:

selection means for selecting a point spread function;

deconvolution means for deconvolving said analog data set with said selected point spread function; and means for generating a compressed data set containing non-redundant components as a result of said step of deconvolving said data.

9. The system of claim 8 wherein said deconvolution means generates an array of CLEAN components.

10. A system for the compression of data comprising:

selection means for selecting a point spread function:

deconvolution means for deconvolving said analog data set with said selected point spread function:

means for generating a compressed data set containing non-redundant components as a result of said step of deconvolving said data; and means for storing said non-redundant components as said compressed data set.

* * * * *